United States Patent
Picken

(10) Patent No.: US 12,492,357 B2
(45) Date of Patent: Dec. 9, 2025

(54) FOAMING PRODUCE WASHES AND METHODS OF DISPENSING AND USING THE SAME

(71) Applicant: Beaumont Products, Inc., Kennesaw, GA (US)

(72) Inventor: Jeffrey M. Picken, Kennesaw, GA (US)

(73) Assignee: BEAUMONT PRODUCTS, INC., Kennesaw, GA (US)

( * ) Notice: Subject to any disclaimer, the term of this patent is extended or adjusted under 35 U.S.C. 154(b) by 423 days.

(21) Appl. No.: 17/968,122

(22) Filed: Oct. 18, 2022

(65) Prior Publication Data
US 2024/0124798 A1    Apr. 18, 2024

(51) Int. Cl.
| | | |
|---|---|---|
| C11D 1/66 | (2006.01) | |
| A23L 5/00 | (2016.01) | |
| C11D 3/00 | (2006.01) | |
| C11D 3/04 | (2006.01) | |
| C11D 3/20 | (2006.01) | |
| C11D 3/382 | (2006.01) | |
| C11D 17/00 | (2006.01) | |

(52) U.S. Cl.
CPC ............... *C11D 1/662* (2013.01); *A23L 5/57* (2016.08); *C11D 3/0084* (2013.01); *C11D 3/044* (2013.01); *C11D 3/2065* (2013.01); *C11D 3/2079* (2013.01); *C11D 3/382* (2013.01); *C11D 17/0043* (2013.01); *A23V 2002/00* (2013.01); *C11D 2111/10* (2024.01)

(58) Field of Classification Search
CPC ....... C11D 1/662; C11D 3/0084; C11D 3/044; C11D 3/2065; C11D 3/2079; C11D 3/382; C11D 17/0043; C11D 2111/10; A23L 5/57; A23V 2002/00
See application file for complete search history.

(56) References Cited

U.S. PATENT DOCUMENTS

| | | | | |
|---|---|---|---|---|
| 2005/0003990 A1* | 1/2005 | Smith | .................. | C11D 3/3765 510/421 |
| 2005/0233915 A1 | 10/2005 | Smith | | |
| 2009/0318321 A1* | 12/2009 | Hood | ...................... | C11D 3/43 510/106 |

FOREIGN PATENT DOCUMENTS

| | | | | |
|---|---|---|---|---|
| WO | WO-0218531 A1 * | 3/2002 | ......... | C11D 11/0023 |
| WO | WO-2015112671 A1 * | 7/2015 | ............. | A01N 59/00 |

OTHER PUBLICATIONS (n.d.). Plastic Bottles, White PET Bottles w/ White Foamer Pumps. SKS Bottle & Packaging, Inc. Retrieved May 16, 2024, from https://www.sks-bottle.com/340c/fin14x.html.
Target Brands, Inc. (n.d.). Dawn Fresh Rapids Scent Platinum Dishwashing Foam Pump Soap—10.1 fl oz. Target. Retrieved May 16, 2024, from https://www.target.com/p/dawn-platinum-dishwashing-foam-pump-fresh-rapids-scent-soap-10-1-fl-oz/-/A-13044216?ref=tgt_adv_XS000000&AFID=google_ssc_df&fndsrc=tmnv&DFA=71700000093246862&CPNG=PLA_DVM%2Ba064R0000136fiCQAQ-P%26G_HP_Home+Care_Google+Search_SSC_1H_2022-642796&adgroup=Home.
Beaumont Products, Inc. (n.d.) Original Veggie Wash Retrieved May 17, 2024, from https://www.beaumontproducts.com/Category/Veggie-Wash-Original/.

* cited by examiner

*Primary Examiner* — Angela C Brown-Pettigrew
*Assistant Examiner* — Brittany Sharon Harris
(74) *Attorney, Agent, or Firm* — Perilla Knox & Hildebrandt LLP; Stephanie Davy-Jow; Cynthia J. Lee

(57) ABSTRACT

The disclosure relates to produce wash products including a dispenser with a liquid retaining container and a foam dispenser head and a liquid produce wash present in the liquid retaining container, wherein the foam dispenser head is fluidly connected to the liquid produce wash, and wherein the liquid produce wash includes a natural oil or a component thereof, a fatty acid, an antioxidant, a surfactant, an alkali metal hydroxide, glycerin, water, and, optionally, a preservative. In some aspects, the foam dispenser head includes an air chamber and a liquid chamber fluidly connected to the liquid retaining container; when the foam dispenser head is activated by pumping or another means, air and the liquid produce wash are dispensed simultaneously as a foam. Also disclosed are methods of dispensing a produce wash, methods of using the disclosed produce washes to wash a piece of firm produce, and liquid produce washes.

6 Claims, No Drawings

FOAMING PRODUCE WASHES AND METHODS OF DISPENSING AND USING THE SAME

BACKGROUND

Fruits and vegetables are important for a healthy diet but often arrive in supermarkets containing wax coatings, microorganisms, traces of agricultural chemicals such as herbicides or pesticides, and other residues related to growing conditions, harvest, transport, and/or handling. These coatings, chemicals, and microorganisms may affect the flavor of produce items as well as potentially being detrimental to consumer health. Furthermore, some larger produce items, such as melons, which need to be cut into smaller pieces prior to consumption, may harbor *E. coli* or other pathogens on their rinds, which may be introduced to interior surfaces through cutting. Thus, a need exists for an effective washing system for produce that is capable of removing such treatments and contaminants prior to consumption.

Soaps, including dish soaps and detergents, are effective at removing contaminants, but can be difficult to completely remove from the produce items. At a minimum, residual soap can adversely affect the taste of the produce items, but may also contain irritants or ingredients not intended for contact with or use on food. In some cases, produce items may actually absorb soap, and consumption of residual soap can cause gastrointestinal irritation. Furthermore, absorbed soap may not be removed even if the produce items are peeled. Water alone can be used to rinse produce, but may not be effective at removing hydrophobic contaminants, waxes, and the like.

In order to address some of the concerns related to using water and/or soap to clean produce items, various produce washes have been introduced. However, current products have several disadvantages. Current solutions are typically provided as larger spray bottles, which require picking up and triggering to spray. This can be unwieldly and difficult for younger children. Furthermore, the products' sizes frequently require storage under the sink.

What is needed is a produce wash that can be used quickly and effectively to completely remove contaminants from produce surfaces. An ideal product would be visible in order for consumers to confirm complete coverage of produce surfaces while also leaving no aftertaste or other residue. It would further be desirable if the produce wash were provided in a container taking up little counter space and could be dispensed in small amounts to avoid product waste and frequent repurchasing. These needs and other needs are satisfied by the present disclosure.

SUMMARY

In accordance with the purpose(s) of the present disclosure, as embodied and broadly described herein, the disclosure, in one aspect, relates to produce wash products including a dispenser with a liquid retaining container and a foam dispenser head and a liquid produce wash present in the liquid retaining container, wherein the foam dispenser head is fluidly connected to the liquid produce wash, and wherein the liquid produce wash includes a natural oil or a component of a natural oil, a fatty acid, an antioxidant, a surfactant, an alkali metal hydroxide, glycerin, water, and, optionally, a preservative. In some aspects, the foam dispenser head includes an air chamber and a liquid chamber fluidly connected to the liquid retaining container; when the foam dispenser head is activated by pumping or another means, air and the liquid produce wash are dispensed simultaneously as a foam. Also disclosed are methods of dispensing a produce wash, methods of using the disclosed produce washes to wash a piece of firm produce, and liquid produce washes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

In one aspect, disclosed herein is a produce wash product including:
  (a) a dispenser comprising a liquid retaining container and a foam dispenser head; and
  (b) a liquid produce wash present in the liquid retaining container;
  wherein the foam dispenser head is fluidly connected to the liquid produce wash; and
  wherein the liquid produce wash comprises a natural oil or a component of a natural oil, a fatty acid, an antioxidant, a surfactant, an alkali metal hydroxide, glycerin, and water.

In some aspects, the liquid produce wash also includes a preservative. In another aspect, the foam dispenser head includes an air chamber and a liquid chamber fluidly connected to the liquid retaining container and wherein, when the foam dispenser head is activated, air and the liquid produce wash are dispensed simultaneously as a foam. Further in this aspect, the foam dispenser head can be activated by pumping. Specific natural oils and components thereof, fatty acids, antioxidants, preservatives, surfactants, and alkali metal hydroxides useful herein are discussed in detail below.

Also disclosed herein is a method of dispensing a produce wash, the method including at least the following steps:
  (a) providing a concentrated produce wash, wherein the produce wash comprises a natural oil or a component of a natural oil, a fatty acid, an antioxidant, a surfactant, an alkali metal hydroxide, glycerin, and water; and
  (b) dispensing the produce wash as a foam from a foam dispenser head.

In an aspect, the concentrated produce wash also includes a preservative.

In still another aspect, dispensing the produce wash includes at least:
  (a) mixing the produce wash with air in the foam dispenser head to create the foam; and
  (b) dispensing the foam via the foam dispenser head.

In some aspects, the produce wash can be diluted with water prior to dispensing the produce wash.

Also disclosed herein is a method of washing a piece of firm produce, the method including at least:
  (a) dispensing a produce wash using the disclosed method into the hand of a user;

(b) rubbing the produce wash on the piece of firm produce for at least 30 seconds; and (c) rinsing the piece of firm produce with water to remove the produce wash.

Exemplary pieces of firm produce that can be washed using the disclosed produce washes and methods are described in further detail below. In one aspect, following step (c), the piece of firm produce is substantially free from at least one of coating waxes, soil, microbial pathogens, handling residues, and/or agricultural chemicals. In another aspect, following step (c), the piece of firm produce is substantially free from scents, flavors, or both imparted by the produce wash.

Also disclosed herein are liquid produce washes including:

(a) a natural oil, a component of a natural oil, or a combination thereof in an amount of from about 0.051 to about 1.21 vol %;

(b) a fatty acid in an amount of from about 1.4 to about 1.8 vol %;

(c) an antioxidant in an amount of from about 0.006 to about 0.02 vol %;

(d) a preservative in an amount of from about 0.3 to about 0.8 vol %;

(e) a surfactant in an amount of from about 1.8 to about 2.5 vol %;

(f) an alkali metal hydroxide in an amount of from about 0.9 to about 1 vol %;

(g) glycerin in an amount of from about 1.5 to about 1.8 vol %; and (h) water in an amount of from about 90 to about 96 vol %.

In still another aspect, the liquid produce wash can include:

(a) 0.9 vol % limonene;

(b) 0.003 vol % orange oil;

(c) 1.5 vol % oleic acid;

(d) 0.006 vol % carnosic acid;

(e) 0.3 vol % potassium sorbate;

(f) 1.8 vol % decyl glucoside;

(g) 0.9 vol % potassium hydroxide;

(h) 1.5 vol % glycerin; and (i) 93.091 vol % water.

In yet another aspect, the liquid produce washes disclosed herein are non-irritating to human tissues. Also disclosed herein are foams including the air and the disclosed liquid produce washes.

The foaming produce washes disclosed herein have numerous advantages over known products. In one aspect, the process of foam formation upon dispensing the washes creates a large volume of visible produce wash, with the volume consisting of both air and produce wash composition, as opposed to spray-on or soaking products, for which dispensed volumes consist entirely of produce wash composition. Thus, in this aspect, effective cleaning can be achieved using smaller amounts of active ingredients. In one aspect, using smaller amounts of active ingredients can be convenient for manufacturers as well as consumers. In a further aspect, manufacturers can take advantage of the lower costs associated with small amounts of materials and lower shipping weights, while consumers are presented with a container having a smaller footprint in the home and a need to purchase replacement products less frequently.

In another aspect, the foaming produce washes disclosed herein are beneficial to consumers in that they produce a visible lather or foam on produce without the need for harsh, irritating foaming ingredients. Further in this aspect, the visible lather or foam allows consumers to easily see that all surfaces of the produce has been contacted by the produce washes, or to use their hands to transfer the washes onto uncontacted areas. In a further aspect, having visible lather or foam can be especially important for a product that is colorless, near-colorless, or will be used on brightly- or deeply-colored surfaces of produce items. In still another aspect, many consumers have been conditioned to associate foam or lather with cleanliness, and the produce washes of the present disclosure thus provide reassurance to consumers that their use is effective to ensure food safety.

In still another aspect, the foaming produce washes require less effort on the part of consumers to use than do soaking-style produce washes. In one aspect, the disclosed produce washes can be dispensed with a single pump from a container stored in a convenient area such as, for example, next to a kitchen sink, and used as needed, during meal preparation or for preparing a piece of fruit as a fast, healthy snack. In a further aspect, no further materials or supplies are required for using the washes, making them more convenient than soaking washes that require a clean sink or bowl and a large volume of product, as well as a longer amount of time to carry out the soaking procedure.

In still another aspect, the disclosed produce washes are effective at removing waxes, soil, agricultural chemicals, microorganisms, and handling residue from firm items of produce including, but not limited to, apples, pears, lemons, oranges, limes, grapefruits, plums, peaches, nectarines, carrots, parsnips, turnips, leeks, potatoes, sweet potatoes, broccoli, cauliflower, celery, scallions, zucchini squash, cucumber, snap peas, onions, bananas, yellow squash, radishes, asparagus, beets, tomatoes, peppers, eggplants, and other firm produce items. In another aspect, the disclosed produce items can also be used on fruits and vegetables typically cut into smaller pieces and to have the peel or rind removed prior to cooking or consumption including, but not limited to, winter squash, pumpkins, cantaloupes, watermelons, honeydews, pineapples, and the like.

In one aspect, the disclosed produce washes do not leave any aftertaste, residue, or scent behind after they are rinsed off and thus do not affect the flavor of the foods they come into contact with. In another aspect, the disclosed produce washes are made with natural ingredients, are kosher-certified, and are vegan, thus making them suitable for use by individuals having a variety of allergies and/or otherwise requiring a specialized diet.

Dispensers for the Produce Washes. In one aspect, the produce washes disclosed herein can be provided in a liquid container that includes a foam dispenser head, wherein the foam dispenser head produces a foam or lather by mixing the produce washes with air. In another aspect, the liquid container can be a disposable or recyclable container or can be a refillable, permanent product. In another aspect, the foam dispenser head and/or liquid container do not require the use of gas propellants, pressurized gases, or the like. In one aspect, the lack of propellants is environmentally benign since numerous currently used propellants are thought to contribute to global warming and/or ozone depletion. In another aspect, the lack of propellants reduces the likelihood of dispenser malfunction, since only one component (i.e., the produce wash) must be transported from the liquid container to the dispenser head.

In an aspect, numerous suitable foam dispensing liquid containers are known in the art including, but not limited to, those disclosed in U.S. Pat. Nos. 3,471,064; 6,409,050; 9,120,108; 11,130,932; and 11,253,111. It is to be understood that these containers and dispensers are exemplary only and non-limiting and that any bottle or dispenser having a foam-producing capability can be used in conjunction with the disclosed produce washes.

In any of these aspects, when the disclosed produce washes are within the liquid container, they are in a liquid form, but upon dispensing from the foam dispenser head, the expelled produce washes are in a foam form.

In one aspect, the produce washes can be provided as concentrated forms to be diluted with water in order to achieve a lower solids content, or can be provided as ready-to-use products. In a further aspect, when the produce washes are provided in concentrated form, water in any suitable form can be used for dilution including, but not limited to, tap water, softened water, unsoftened water, deionized water, filtered water, distilled water, or the like. In any of these aspects, incorporation of water in the produce washes, either at the point of manufacture or through dilution at the point of use, can serve to adjust the viscosity, surface tension, and/or other properties of the produce washes so as to ensure compatibility with the foam dispenser head. In one aspect, when the produce washes are provided in concentrated form, instructions are provided on the packaging material to indicate to the consumer a suitable volume of water with which to dilute the concentrated produce washes. Further in this aspect, a specific volume may be indicated, or a fill line may be included on the packaging.

In an aspect, the produce washes, whether provided as ready to use or whether diluted with a suitable amount of water, are provided in a liquid container and a tube, pipette, straw, or another means fluidly connects the produce washes to the dispenser head. In some aspects, the produce washes can be provided in refill bottles and the foam dispenser head and tube, pipette, or straw can be removed from an empty container and reused on a new, full container.

In any of these aspects, the foam dispenser head can combine the produce wash in the liquid container with air. In a further aspect, the foam dispenser head can have an air chamber surrounding a liquid chamber. Further in this aspect, when the dispenser head is activated, such as by pumping, air and produce wash are dispensed simultaneously to create the foam. In any of these aspects, the dispenser head allows for the precise mixing of produce wash and air.

Components of the Produce Washes. In one aspect, the produce washes disclosed herein include ingredients and/or components having specified functions including stable shelf life (i.e. preservatives, antioxidants), detergent properties, foam formation, viscosity, fragrance, and the like. Each category of ingredient and/or component is described in more detail below, and an exemplary composition is shown in the Examples.

In one aspect, the produce washes disclosed herein can include a natural oil or a component of a natural oil, or a combination thereof. In one aspect, the component of a natural oil can be limonene. In a further aspect, limonene may be present as the D-isomer of limonene and, in some aspects, is isolated from the oil of citrus fruit peels by a method such as, for example, centrifugal separation or steam distillation. In any of these aspects, limonene is food safe and/or food grade and may impart a natural fragrance to the produce washes disclosed herein. In one aspect, the amount of limonene is from about 0.5 to about 1.2 vol % of the disclosed formulations, or is about 0.5, 0.6, 0.7, 0.8, 0.9, 1.0, 1.1, or about 1.2 vol % of the disclosed formulations, or a combination of any of the foregoing values, or a range encompassing any of the foregoing values.

In another aspect, the natural oil can be orange oil. In some aspects, the orange oil can be organic. In a further aspect, the orange oil can be extracted during the process of orange juice production and is a cold-pressed oil. In one aspect, the orange oil contains a large proportion (as much as 90% or greater) of D-limonene but may also include trace components including, but not limited to, α-pinene, sabinene, β-pinene, myrcene, octanal, linalool, δ-3-carene, decanal, or any combination thereof. In one aspect, when present at the amounts disclosed herein, orange oil is food safe and/or food grade, non-toxic, and non-irritating, and may impart a natural fragrance to the produce washes disclosed herein. In another aspect, instead of or in addition to the orange oil, the produce washes disclosed herein can include lemon oil. In one aspect, the amount of orange oil is from about 0.001 to about 0.01 vol % of the disclosed formulations, or is about 0.001, 0.002, 0.003, 0.004, 0.005, 0.006, 0.007, 0.008, 0.009, or about 0.01 vol % of the disclosed formulations, or a combination of any of the foregoing values, or a range encompassing any of the foregoing values.

In one aspect, the produce washes disclosed herein include a fatty acid. In a further aspect, the fatty acid can be oleic acid. In a further aspect, the oleic acid can be kosher. In still another aspect, the oleic acid incorporated into the disclosed produce washes can be a 70% oleic acid commercial product. In one aspect, oleic acid is a monounsaturated C18 omega-9 fatty acid. In another aspect, when the oleic acid is incorporated into compositions also containing an alkali-based ingredient (e.g. potassium hydroxide, sodium hydroxide, or the like), such as those disclosed herein, alkali salts of oleic acid can be formed. In a still further aspect, alkali salts of oleic acid may be particularly useful for their detergent properties. In one aspect, the amount of oleic acid can be about 1.4 to about 1.8 vol % of the disclosed formulations, or can be about 1.4, 1.5, 1.6, 1.7, or about 1.8 vol % of the disclosed formulations, or a combination of any of the foregoing values, or a range encompassing any of the foregoing values.

In another aspect, the produce washes disclosed herein include an antioxidant. In a further aspect, the antioxidant can be a natural product such as, for example, ROSAMOX™ from Kemin Industries, Inc. (Des Moines, IA, USA). Further in this aspect, ROSAMOX™ may contain carnosic acid, carnosol, a combination thereof, and/or other compounds extracted from rosemary leaves. In one aspect, the antioxidant can be supplied in a carrier such as, for example, sunflower seed oil. In still another aspect, the antioxidant is non-irritating, food safe and/or food grade, and non-allergenic. In one aspect, the antioxidant is a natural alternative to vitamin E, butylated hydroxytoluene (BHT), and similar compounds. In one aspect, the amount of antioxidant can be from about 0.006 to about 0.02 vol % of the disclosed formulations, or can be about 0.006, 0.007, 0.008, 0.009, 0.01, 0.015, or about 0.02 vol % of the disclosed formulations, or a combination of any of the foregoing values, or a range encompassing any of the foregoing values.

In still another aspect, the produce washes disclosed herein include a preservative. In one aspect, the preservative can be potassium sorbate, sodium sorbate, or a combination thereof. In an alternative aspect, the sorbate can include benzoic acid, sodium benzoate, another benzoate (e.g. ammonium benzoate, calcium benzoate, magnesium benzoate, and/or potassium benzoate). In any of these aspects, the preservative is food-safe and/or food grade and non-irritating at the concentrations used in the disclosed compositions. In any of these aspects, the preservative can inhibit the growth of molds, yeasts, and other microorganisms in the disclosed compositions. In one aspect, the amount of preservative can be from about 0.3 to about 0.8 vol % of the disclosed formulations, or can be about 0.3, 0.4, 0.5, 0.6, 0.7, or about 0.8 vol % of the disclosed formulations, or a combination of any of the foregoing values, or a range encompassing any of the foregoing values.

In one aspect, the produce washes disclosed herein include a surfactant. In a further aspect, the surfactant can be a non-ionic surfactant such as, for example, decyl glucoside, an alkyl polyglucoside, or a combination thereof. In any of these aspects, the non-ionic surfactant may be useful for enhancing the formation of foams in detergents. In one aspect, the amount of surfactant can be from about 1.8 to about 2.5 vol % of the disclosed formulations, or can be about 1.8, 1.9, 2.0, 2.1, 2.2, 2.3, 2.4, or about 2.5 vol % of the disclosed formulations, or a combination of any of the foregoing values, or a range encompassing any of the foregoing values.

In an aspect, the produce washes disclosed herein include potassium hydroxide (also known as caustic potash) or sodium hydroxide. In a further aspect, in combination with a free fatty acid such as, for example, oleic acid, potassium hydroxide or another strong alkali metal base can form an alkali salt of the fatty acid. In a further aspect, the alkali salt of the fatty acid has detergent properties that are useful for foam formation and removal of contaminants from produce. In one aspect, the potassium hydroxide can be provided as a 45% pure potassium hydroxide. In any of these aspects, potassium hydroxide or another strong base is present in a low enough concentration in the disclosed compositions that it will not irritate the skin and/or not display caustic properties when the compositions are used. In one aspect, the amount of potassium hydroxide or other strong base can be from about 0.9 to about 1 vol % of the disclosed formulations, or can be about 0.9, 0.91, 0.92, 0.93, 0.94, 0.95, 0.96, 0.97, 0.98, 0.99, or about 1 vol % of the disclosed formulations, or a combination of any of the foregoing values, or a range encompassing any of the foregoing values.

In one aspect, the produce washes disclosed herein include glycerin. In a further aspect, the glycerin can be kosher or organic, and/or can be obtained from vegetable sources such as, for example, palm oil. In one aspect, the glycerin can be provided as 99.7% USP (US Pharmacopeia) grade glycerin. In any of these aspects, the glycerin can make the formulations more viscous and/or reduce water activity, thus allowing the produce washes an effective amount of contact time with the items to be washed in order to remove contaminants. In one aspect, the glycerin is hypoallergenic and prevents irritation that can occur with other thickeners. In another aspect, the glycerin is odorless, non-toxic, non-irritating, and food safe and/or food grade. In one aspect, the amount of glycerin can be from about 1.5 to about 1.8 vol % of the disclosed formulations, or can be about 1.5, 1.6, 1.7, or about 1.8 vol % of the disclosed formulations, or a combination of any of the foregoing values, or a range encompassing any of the foregoing values.

In still another aspect, the produce washes disclosed herein include a solvent. In a further aspect, the solvent can be water, including, but not limited to, deionized water. In one aspect, water can be used to enhance flowability and viscosity of the produce washes such that they are compatible with dispensing through the foaming pumps as described herein. In one aspect, the amount of water can be determined after addition of the other components in order to bring the total vol % of components in the formulations to 100%, or can be from about 90 to about 96 vol % of the disclosed formulations, or can be about 90, 91, 92, 93, 94, 95, or about 96 vol % of the disclosed formulations, or a combination of any of the foregoing values, or a range encompassing any of the foregoing values.

In one aspect, a concentrated produce wash can be prepared according to the procedures described in the Examples and diluted to a final concentration for use. Further in this aspect, the concentrated produce wash can contain an amount of water for mixing purposes, along with the other components disclosed herein. In an aspect, during preparation of the final product to be placed in the foaming dispensers, this concentrated produce wash can be diluted with additional water in a ratio of about 30% concentrated produce wash to about 70% water.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by," "comprising," "comprises," "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a strong base," "a preservative," or "an antioxidant," includes, but is not limited to, mixtures or combinations of two or more such strong bases, preservatives, or antioxidants, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y.' The range can also be expressed as an upper limit, e.g. 'about x, y, z, or less' and should be interpreted to include the specific ranges of 'about x,' 'about y', and 'about z' as well as the ranges of 'less than x', less than y', and 'less than z'. Likewise, the phrase 'about x, y, z, or greater' should be interpreted to include the specific ranges of 'about x,' 'about y,' and 'about z' as well as the ranges of 'greater than x,' greater than y,' and 'greater than z.' In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a strong base refers to an amount that is sufficient to achieve the desired improvement in the property modulated by the formulation component, e.g. achieving the desired level of formation of alkali salts of free fatty acids. The specific level in terms of vol % in a composition required as an effective amount will depend upon a variety of factors including the amount and type of free fatty acid, presence of any acidic components in the formulation, and the desired final pH of the composition.

As used herein, the terms "optional" or "optionally" means that the subsequently described event or circumstance can or cannot occur, and that the description includes instances where said event or circumstance occurs and instances where it does not.

"Food safe" as used herein refers to an ingredient, condition, or practice that preserves the quality of a produce item, such as a fruit or vegetable, in order to prevent contamination and/or a food-borne illness. In some aspects, the produce washes disclosed herein include food safe ingredients. "Food grade" as used herein refers to a material safe for human consumption or safe to come into direct contact with a food product.

An "irritant" as used herein refers to a substance that can cause inflammation, redness, itching, or other discomfort to a body surface including, but not limited to, skin or a mucous membrane. Some substances may be considered irritants in high concentrations but may be non-irritating in lower concentrations. In one aspect, the ingredients of the produce washes are not irritants at the concentrations provided for herein.

Unless otherwise specified, temperatures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Exemplary Produce Wash Formulation

Components of an exemplary produce wash formulation are provided in Table 1:

TABLE 1

Exemplary Produce Wash Formulation

| Component | Amount (vol %) |
|---|---|
| Limonene | 0.9 |
| Organic Orange Oil | 0.003 |
| Oleic Acid (70% Kosher) | 1.5 |
| ROSAMOX ™ | 0.006 |
| Potassium Sorbate | 0.3 |
| Decyl Glucoside | 1.8 |
| Potassium Hydroxide (45%) | 0.9 |
| Glycerin (99.7 USP/Kosher) | 1.5 |
| Deionized Water | 93.091 |

Example 2: Method for Making an Exemplary Produce Wash

An exemplary produce wash can be produced as follows: 18 pounds of limonene, 0.1 pounds of organic orange oil, 30.0 pounds of kosher 70% oleic acid, 0.1 pounds of ROSAMOX™, 6.0 pounds of potassium sorbate, and 36.0 pounds of decyl glucoside (APG® GLUCOPON® 425N from BASF SE, Ludwigshafen, Germany) are added to a 55 gallon drum and a mixer is inserted. Initial mixing speed is slow to avoid splashing and gradually increased over time. 18.0 pounds of potassium hydroxide 45% are slowly added to the 55 gallon drum while mixing for at least 10 minutes. If needed for adequate mixing, 36 pounds of water are added to thin the batch. If water is added at this stage, the amount is subtracted from later dilutions to achieve a consistent product composition.

If a high-shear blade or mixer is used, following addition of potassium hydroxide and/or water, additional mixing is conducted for at least 20 minutes at the highest speed that does not create a foam. If a low-shear blade is used, following addition of potassium hydroxide and/or water, additional mixing is conducted for at least 2 hours at the highest speed that does not produce foam.

Following mixing, the contents of the 55-gallon drum are added to a 220-gallon tote.

30.0 pounds of kosher glycerin 99.7 USP are added to the 55-gallon drum followed by 96.0 pounds of water. An air mixer is inserted into the drum and the glycerin and water are mixed until uniform, using the same blade (either high-shear or low-shear) as previously used. Mixing is conducted for at least 5 minutes or until the blade and drum are rinsed off and the contents of the drum are uniform.

The contents of the drum are added to the 220-gallon tote. The air mixer is inserted into the tote and the contents are mixed until uniform, typically at least 5 minutes. The contents of the tote are visually checked for uniformity and mixed for longer if necessary. The remainder of the water (for a total of 336 pounds of water in the composition) is added and mixing is conducted for at least 5 minutes or longer if necessary to achieve visual uniformity.

Following combination of the components, pH level of the produce wash concentrate is measured and should be between 11.0 and 13.0. If pH of the concentrate does not fall in this range, pH is adjusted using 45% caustic potash (to increase pH levels below 11) or HCl (to decrease pH levels above 13) as needed, followed by 15-20 minutes of mixing.

A 25 g aliquot of the concentrate is mixed with 75 g of water. pH of the diluted solution should be from 11.8 to 12.4 and have a specific gravity of 0.980 to 1.050 at from 18-22° C. Color should be translucent to slightly cloudy with a beige or tan color, and the odor should be a slightly citrus odor.

Following specific gravity and further pH testing, the batch of concentrate at 600 pounds and representing 30% of a total final dilution is mixed with 1400 pounds of water to achieve a ready-to-use dilution of the produce wash. The final dilution is tested for pH and packaged for distribution. When produce washes were prepared with the batch of concentrate representing 25% of the total final dilution, the produce washes did not produce foam.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A food safe produce wash product comprising:
   (a) a dispenser comprising a liquid retaining container and a foam dispenser head; and
   (b) a liquid produce wash present in the liquid retaining container;
   wherein the foam dispenser head is fluidly connected to the liquid produce wash;
   wherein the foam dispenser head is activated by pumping; and
   wherein the liquid produce wash comprises 0.9 vol % limonene, 0.003 vol % orange oil, 1.5 vol % oleic acid, 0.006 vol % carnosic acid, 0.3 vol % potassium sorbate, 1.8 vol % decyl glucoside, 0.9 vol % potassium hydroxide, 1.5 vol % glycerin, and (i) 93.091 vol % water.

2. The produce wash product of claim 1, wherein the liquid produce wash further comprises a preservative.

3. The produce wash product of claim 1, wherein the foam dispenser head comprises an air chamber and a liquid chamber fluidly connected to the liquid retaining container and wherein, when the foam dispenser head is activated, air and the liquid produce wash are dispensed simultaneously as a foam.

4. A liquid produce wash, comprising:
   (a) 0.9 vol % limonene;
   (b) 0.003 vol % orange oil;
   (c) 1.5 vol % oleic acid;
   (d) 0.006 vol % carnosic acid;
   (e) 0.3 vol % potassium sorbate;
   (f) 1.8 vol % decyl glucoside;
   (g) 0.9 vol % potassium hydroxide;
   (h) 1.5 vol % glycerin; and
   (i) 93.091 vol % water.

5. The liquid produce wash of claim 4, wherein the liquid produce wash is non-irritating to human tissues.

6. A foam comprising air and the liquid produce wash of claim 4.

* * * * *